United States Patent
Karri et al.

(10) Patent No.: US 8,817,749 B2
(45) Date of Patent: Aug. 26, 2014

(54) CALL SETUP FOR CIRCUIT SWITCHED FALL BACK CALLS

(75) Inventors: Sai Sravan Bharadwaj Karri, Santa Clara, CA (US); Mohan Rao Thota, Sunnyvale, CA (US); Jinhua Ling, Palo Alto, CA (US); Sachin J Sane, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 13/586,477

(22) Filed: Aug. 15, 2012

(65) Prior Publication Data

US 2014/0050196 A1    Feb. 20, 2014

(51) Int. Cl.
*H04W 4/00*    (2009.01)
(52) U.S. Cl.
USPC .......................................................... 370/331
(58) Field of Classification Search
CPC . H04W 36/14; H04W 36/18; H04W 36/0011; H04W 80/04; H04W 88/06
See application file for complete search history.

(56) References Cited

U.S. PATENT DOCUMENTS

| | | |
|---|---|---|
| 2010/0284333 A1 | 11/2010 | Shirota et al. |
| 2011/0103277 A1* | 5/2011 | Watfa et al. .................... 370/310 |
| 2011/0149852 A1* | 6/2011 | Olsson et al. ................. 370/328 |
| 2011/0195714 A1 | 8/2011 | Sawinathan |
| 2011/0312321 A1* | 12/2011 | Ramachandran et al. . 455/426.1 |
| 2011/0317659 A1* | 12/2011 | Ramachandran et al. .... 370/331 |
| 2011/0317661 A1 | 12/2011 | Tenny |
| 2012/0127957 A1* | 5/2012 | Koskinen et al. ............. 370/331 |

* cited by examiner

*Primary Examiner* — Chi Pham
*Assistant Examiner* — Fahmida Chowdhury
(74) *Attorney, Agent, or Firm* — Meyertons, Hood, Kivlin, Kowert & Goetzel, P.C.

(57) ABSTRACT

Establishing a circuit-switched fallback (CSFB) call. A request to establish a CSFB call may be received. A first wireless link with a first cell may be released. The first cell may provide packet-switched services but not circuit-switched services. A second wireless link may be established with a second cell. The second cell may provide packet-switched services and circuit-switched services. The CSFB call may be established via the connection to the second cell. Packet-switched registration with the second cell may be performed after the CSFB call is established.

25 Claims, 4 Drawing Sheets

CALL SETUP FOR CIRCUIT SWITCHED FALL BACK CALLS

FIELD OF THE INVENTION

The present application relates to wireless devices, and more particularly to a system and method for establishing a circuit-switched fall back call with reduced call setup time.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

One example of a transition to a next generation in wireless technology is the transition from GSM and UMTS to LTE. LTE utilizes a fully packet-switched network, and does not provide circuit-switched services. UMTS provides circuit-switched services and packet-switched services. A transitional technique in the migration to LTE is the circuit-switched fallback (CSFB) call. In this case, when a wireless device is registered on a CSFB capable LTE network and a circuit-switched call is initiated, the wireless device is redirected to a UMTS network that can support the circuit-switched call.

Unfortunately, since CSFB calls involve the wireless device changing networks before the call is established, they are prone to requiring a relatively long call setup time, which can be a source of frustration for the user. Accordingly, improvements in wireless communications would be desirable.

SUMMARY OF THE INVENTION

In light of the foregoing and other concerns, it would be desirable to provide a way for wireless user equipment (UE) devices to establish circuit-switched fallback (CSFB) calls with a relatively low call setup time.

When a circuit-switched call is initiated at a wireless device which is camped on an LTE network (e.g., a network which does not provide circuit switched services) which is capable of supporting circuit-switched fallback, the UE may be redirected to a UMTS (or other) network which does provide circuit switched services.

In the case of UMTS, the network provides circuit switched services (e.g., for voice calls) and also provides packet-switched services (e.g., for data). Thus, generally, when a UE attaches to such a network, the wireless device may typically register for both circuit-switched (CS) and packet-switched (PS) services. Generally, this may be desirable, in order to provide more complete service to a user of the UE.

However, if the proximate reason for attaching to the UMTS network is to establish a CSFB call, it may be desirable to postpone some or all PS registration procedures, at least until the CSFB call is established. In this way, the call setup time for the CSFB call may advantageously be reduced, in some cases by a significant amount.

For example, one PS registration procedure that may be required for PS services from the new network in some embodiments is a routing area update procedure. If the UMTS base station (BS) to which the wireless device is redirected has a different routing area code than the previous serving LTE BS, the UE may be required to inform the network of the change in routing area in order to resume PS services. If this is performed during establishment of a CS call, and the UE has to wait for the routing area update procedure to finish in order to complete the CS call setup, this can result in a considerable delay in call setup time. For example, in one set of embodiments, performing the routing area update procedure may include updating ciphering and integrity parameters through a security mode command procedure, among other possible non access stratum signaling. Such procedures can require up to approximately 1 s in additional call setup time, in some embodiments, depending on any channel impairments.

Thus, in some embodiments, routing area updates and/or other PS registration procedures may not be performed until after a CSFB call has been established, e.g., potentially including CS radio bearer assignment and possibly alerting of the UE that the CSFB call has been established.

Note that while the above-described example of LTE and UMTS networks cooperating to establish a CSFB call may be representative of one possible implementation, embodiments may be directed to any CSFB capable networks of which one does not provide CS services and the other provides CS and PS services, and are not limited to LTE/UMTS implementations.

Accordingly, embodiments are presented herein of a method for setting up a CSFB call and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present invention can be obtained when the following detailed description of the embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:

UE: User Equipment
BS: Base Station
GSM: Global System for Mobile Communication
UMTS: Universal Mobile Telecommunication System
LTE: Long Term Evolution
CS: Circuit-switched
PS: Packet-switched
CSFB: Circuit-switched fallback Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
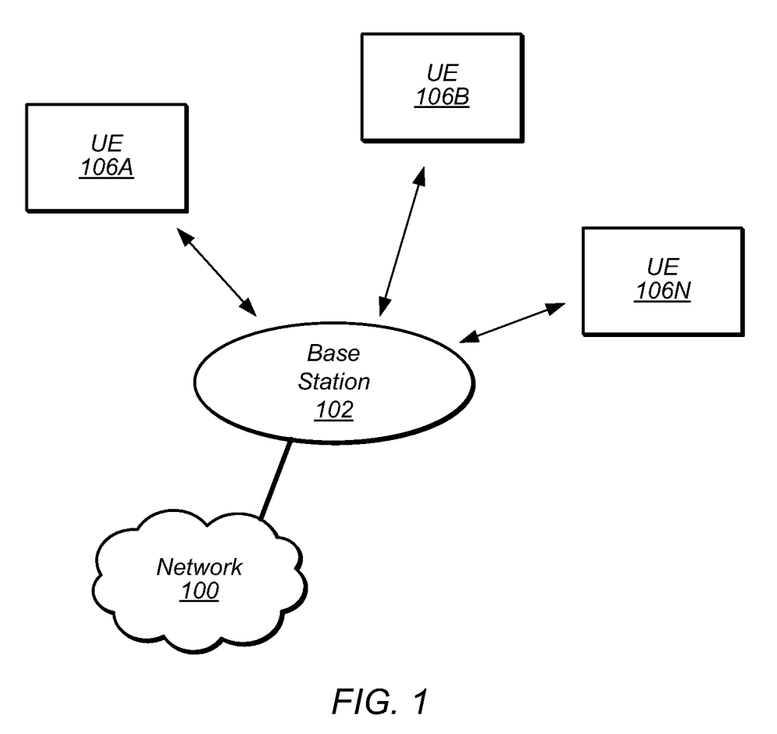
FIG. 1 illustrates an exemplary (and simplified) wireless communication system.
Figure 2:
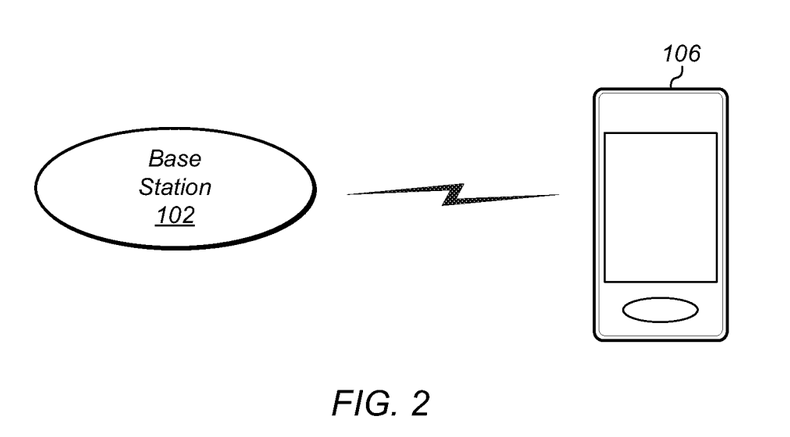
FIG. 2 illustrates a base station in communication with user equipment.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

In some embodiments, UE 106 may be capable of communicating using multiple wireless communication standards. For example, the UE 106 might be configured to communicate using two or more of GSM, UMTS, CDMA200, WiMAX, LTE, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the methods embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication protocols. For example, the UE 106 may be configured to communicate using two or more of UMTS, CDMA 2000, LTE, WLAN, or GNSS. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1xRTT, and separate radios for communicating using each of Wi-Fi and Bluetooth. Other configurations are also possible.

In some embodiments, the UE 106 may be configured to establish a circuit-switched fallback (CSFB) call. For example, the UE 106 might be configured to communicate using either of a first wireless communication technology which provides packet-switched (PS) services but not circuit-switched (CS) services and a second wireless communication technology which provides PS services and CS services. If the UE 106 is using the first wireless communication technology and a CS call is initiated, the UE 106 may be capable of switching to use of the second wireless communication technology in order to establish the call.

In particular, in one set of embodiments, the UE 106 may be configured to establish a CSFB call in a manner that advantageously reduces call setup time by delaying packet-switched registration procedures until after establishment of the CSFB call, such as further described hereinbelow.

Figure 3:
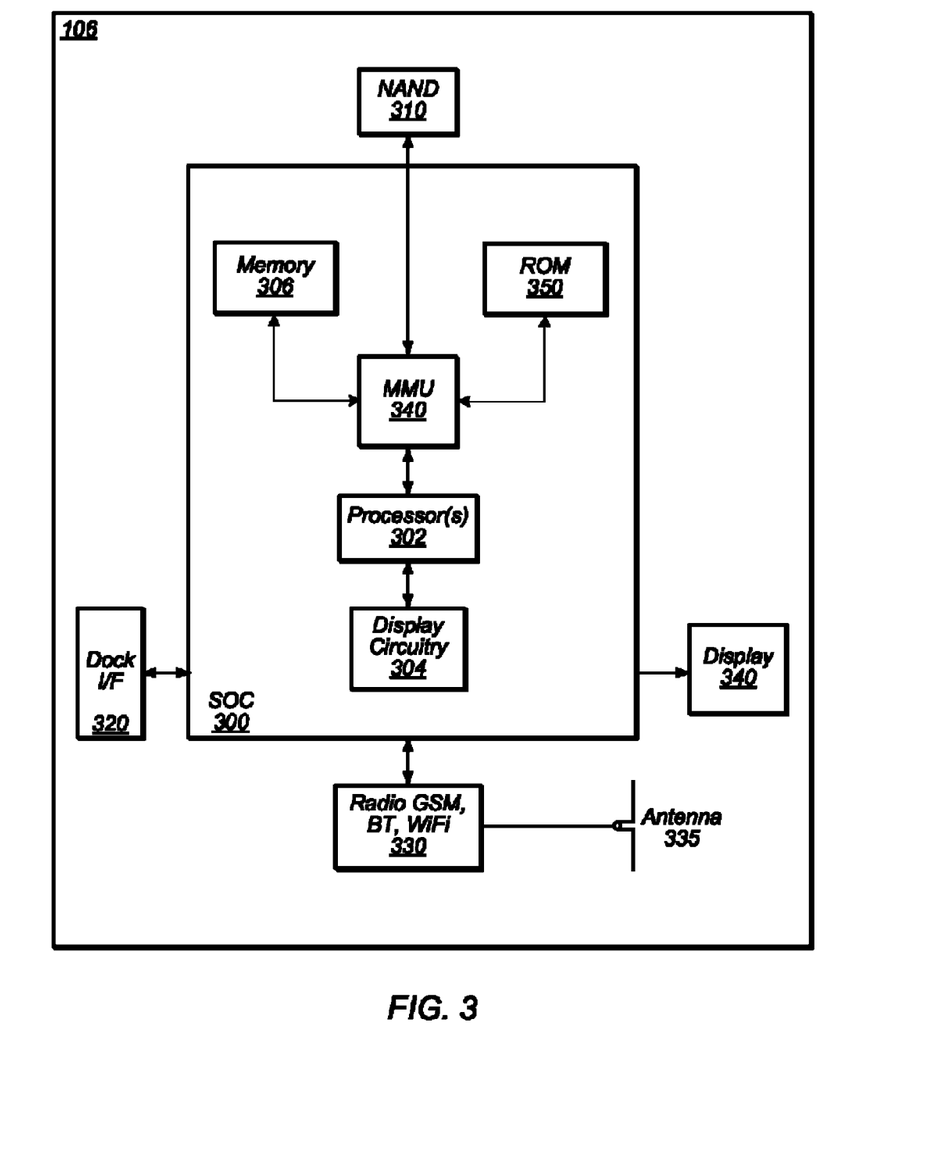
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, CDMA2000, Bluetooth, WiFi, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

Figure 4:
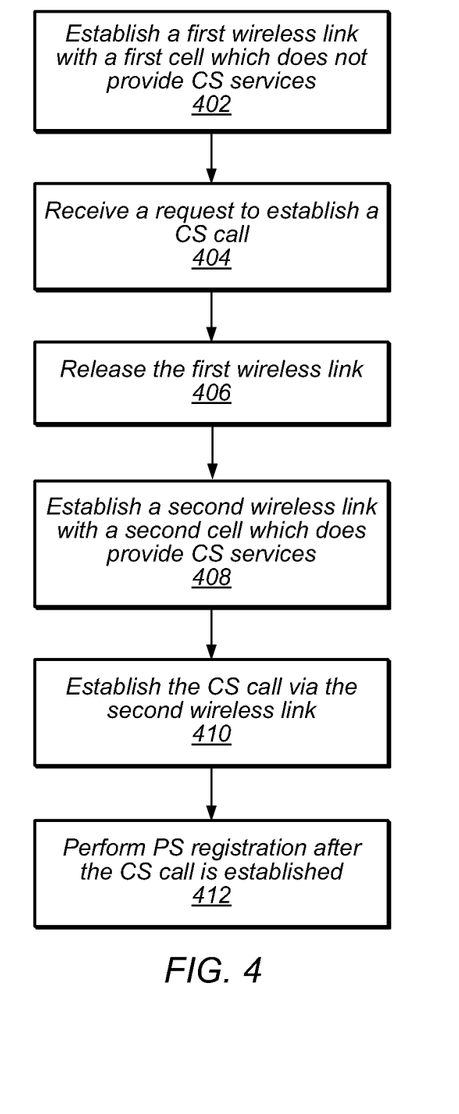
FIG. 4 is a flowchart diagram illustrating a method for setting up a CSFB call according to one embodiment.

As described herein, the UE 106 may include hardware and software components for implementing a method for setting up a CSFB call according to embodiments of this disclosure. FIG. 4 and the description provided with respect thereto relate to one such method according to one set of embodiments.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

FIG. 4—Flowchart

A circuit-switched (CS) call ensures a dedicated connection between a transmitter and receiving device, generally in order to provide quality of service sufficient for a voice call. In cellular communications, the receiving and transmitting devices are generally a UE device (such as UE 106) and a BS (such as BS 102).

Currently, CS call support in cellular communications is provided by core network entities such as mobile switching centers (MSCs) and gateway mobile switching centers (GMSCs), e.g., in UMTS and GSM respectively. As operators and infrastructures migrate gradually to new, packet-switched (PS) only technologies such as LTE, it is highly desirable for the existing CS services to work smoothly with packet core networks. Circuit-switched fallback (CSFB) calls may provide such interoperability.

FIG. 4 is a flowchart diagram illustrating a method for setting up a CSFB call which may be performed by a UE device 106. The method may be particularly useful in situations in which a cellular service provider provides multiple networks which operate according to different (e.g., successive) generations of wireless technologies, overlayed with one another.

For example, a cellular service provider might have an established and fully deployed UMTS network, to which access is broadly available via numerous cells which operate according to UMTS, as well as a partially- or fully deployed LTE network, to which access is available in some areas via cells which operate according to LTE. In the areas in which LTE is deployed, it may be desirable for a UE 106 to camp on the LTE network as a first option, for example because the services which the LTE network does provide may have lower latency and/or higher throughput than those provided by the UMTS network. However, if a service is requested which the LTE network does not provide, such as a circuit-switched call, the UMTS network may be available as a backup option to provide that service. Generally, if a network to which a UE 106 is attached does not provide circuit-switched services and a circuit-switched call is initiated, leading to the UE 106 detaching from the original network and attaching to a different network to establish the circuit switched call, this may be referred to as a circuit-switched fallback (CSFB) call.

More particularly, in some embodiments, when a CSFB call is being established on a network which provides packet-switched (PS) and circuit-switched (CS) services (such as UMTS), it may be desirable to delay registration for the PS services until after the CSFB call is established in order to advantageously minimize call setup time. The method of FIG. 4 relates to a method for establishing a CSFB call according to one such set of embodiments.

The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a first wireless link may be established with a first cell. The first wireless link may operate according to a first wireless communication technology, which may be any of various wireless technologies. In some embodiments, the first wireless link may be a cellular link according to a cellular technology. In some embodiments, the first cell may provide PS services but not CS services. For example, the first wireless link may be a wireless link according to LTE, in some embodiments.

The first cell may accordingly be provided by a base station 102 and may provide a connection to a core network, e.g., of a cellular service provider, which may operate according to the first wireless communication technology. The base station 102 may operate in conjunction with numerous other base stations (which may provide other cells) and other network hardware and software to provide continuous (or nearly continuous) overlapping wireless service over a wide geographic area.

The first cell may serve the UE 106 and provide a connection to the core network via the first wireless link, and as such may act as the "serving" cell for the UE 106. There may also be one or more "neighboring" cells, provided by nearby base stations, with which the UE 106 may be capable of discovering, detecting signals from, and possibly communicating (e.g., depending on signal strength, etc.), but with which the UE 106 may not have an active wireless link. In some embodiments, one or more of the neighboring cells may operate according to other wireless technologies, such as UMTS, CDMA2000, GSM, etc. Some or all of the neighboring cells may be operated by the same wireless service provider which operates the first cell, and may also provide a communicative connection to the core network (or to a core network according to the wireless technology of the respective cell, which may be a second wireless communication technology, and which may be communicatively coupled to the core network of the first cell).

In 404, a request may be received to establish a CS call. The request may be initiated by the UE 106 (e.g., an outgoing/UE-originated call) or initiated by another device and directed to the UE 106 (e.g., an incoming/UE-terminated call). For example, receiving a request to establish a CS call might, in the case of an outgoing call, include receiving user input initiating the CS call at the UE 106. In the case of an incoming call, receiving the request to establish the CS call might include receiving an indication from the core network (e.g., the first network) that another device is attempting to establish a CS call with the UE 106. Since the first cell may not provide CS services, it may be determined to establish the CS call as a CSFB call.

In some embodiments, the serving base station may provide instructions to the UE (which may be received by the UE via the first wireless link) for establishing the CS call as a CSFB call. In some embodiments, the instructions may indicate to the UE to release the first wireless link and establish a second wireless link with a second cell. For example, the UE may be redirected to search for a cell (or may be redirected to a specific cell) that operates according to a wireless technology which provides CS services (e.g., a second wireless technology which is different than the first wireless technology).

In 406, the first wireless link may be released. For example, if the first wireless link operates according to LTE, releasing the first wireless link may include releasing PS radio bearers and a radio resource control (RRC) connection with the serving base station. Other procedures may also or alternatively be included in releasing the first wireless link, as desired, according to various embodiments and depending on the wireless technology in question.

In 408, a second wireless link with a second cell may be established. The second wireless link with the second cell may operate in accordance with a second wireless technology, which may be different than the first wireless technology in accordance with which the first wireless link may operate. For example, according to one set of embodiments, the second wireless link may operate according to UMTS, while the first wireless link may operate according to LTE. The second cell may provide both PS and CS services. The second cell may provide a communicative connection to the same core network (e.g., of the wireless service provider) as provided by the first cell, or may provide a communicative connection to a different core network (e.g., operating according of the second wireless technology) which is communicatively coupled and operated in a cooperative manner (e.g., effectively as a single overall core network) with the core network to which the first cell provided a communicative coupling.

For example, according to one set of embodiments, the first cell may provide an LTE connection to an LTE network, including LTE-specific network entities such as a mobile-management entity (MME). The second cell may provide a UMTS connection to a UMTS network, including UMTS specific network entities such as a mobile switching center (MSC). A communicative interface referred to as SGs may be provided between an MSC entity and an MME entity in order to enable smooth interoperability, in particular in the case of CSFB calls. For example, in some embodiments, an SGs interface may be initiated between an MSC and an MME by an MSC-VLR (visitor location register) in response to a combined attach request for CS and PS services from a UE 106 and may ensure exchange of UE-related information between the MSC-VLR and MME. As will be recognized by those skilled in the art, other examples of different networks operating according to different wireless technologies (e.g., GSM, CDMA2000, etc.) are also possible, and may in some embodiments be communicatively coupled for smooth CSFB transitions.

In 410, the CS call (e.g., the CSFB call) may be established via the second wireless link. As noted above, the second cell may provide CS services as well as PS services. Each may require their own registration procedures, according to some embodiments. Thus, while it may be desirable to register for both CS and PS services, it may be preferable to initially perform only the necessary CS registration procedures to establish the CS call, and not to initiate PS registration procedures which might delay call setup until after the CS call is established.

Establishing the second wireless link and the CS call may include any of a variety of procedures, according to various embodiments. According to one set of embodiments, a radio resource control (RRC) connection between the UE 106 and the network may be requested and established, CS call control (CC) protocol setup may be negotiated, CS radio bearers may be assigned to the UE 106, and/or acknowledgements of successful call setup may be transmitted and received. Other procedures may be performed alternatively or in addition according to various embodiments. The UE 106 may establish the CS call such that the UE 106 and the network have dedicated resources and a dedicated CS link for the CS call, and in some embodiments the UE 106 may "ring" to alert a user of the UE 106 that the call has been established.

In 412, PS registration may be performed after the CS call is established. As noted above, it may be desirable to delay performing some or all PS registration procedures until after the CS call has been established, in order to minimize call setup time. This way, the UE 106 may advantageously utilize the time between the CS call being established and the call recipient answering the call to perform PS registration procedures and re-establish PS services, such that a user of the UE 106 may not notice significantly increased delays with PS services and may enjoy a shorter call setup time for the CS call. For example, since PS radio bearers may have already been suspended during the redirection from the first cell to the second cell, the slight additional delay in resuming PS services caused by delaying PS registration may be significantly less noticeable to a user of the UE 106 than the increased call setup time that would be caused by performing PS registration during call setup.

The PS registration procedures may include any of a variety of procedures. One example of such a procedure is a routing area update (RAU) procedure. Each of the first cell and the second cell may have a routing area code (RA-C) (as well as a location area code (LA-C)). The first cell and the second cell may have the same RA-C or different RA-Cs. The UE 106 may remain registered with the network with the RA-C of the first cell until performing a RAU procedure to indicate to the network that the UE 106 is in the RA-C of the second cell. Thus, if the second cell has a different RA-C than the first cell, the network may need to be informed of the change before PS services can be resumed; accordingly, this may be considered a PS registration procedure.

Thus, in some embodiments, the UE 106 may perform a RAU procedure after the CS call is established. The RAU procedure may include informing the second network, via the second wireless link, of the RA-C of the second cell. The RAU procedure may include one or more non-access stratum signaling and procedures, such as updating ciphering and integrity parameters through a security mode command procedure, in some embodiments. Any other PS registration procedures (e.g., whose nature may depend on the wireless technology of the second cell) may also be performed after the CS call is established. Registering with the second network with the RA-C of the second cell (possibly in combination with other PS registration procedures) may effectively configure the UE 106 for PS services with the second network via the second wireless link with the second cell.

Note that in some embodiments, the RAU procedure may be performed after the CS call is established regardless of whether the RA-C of the second cell is different than the RA-C of first cell. However, at least in some embodiments, because the RAU procedure may be much faster if the RA-C of the UE 106 is not actually being changed to a different RA-C, the reduction in CSFB call setup time realized by delaying the RAU procedure may be significantly greater if the first cell and the second cell have different RA-Cs than if the first cell and the second cell have the same RA-C.

Thus, by utilizing the method of FIG. 4 as provided above according to various embodiments, when establishing a CSFB call, a UE 106 may advantageously delay performing PS registration with a cell until after the CSFB call has been established, thereby considerably reducing the call setup time relative to what would be required if PS registration procedures were performed during CSFB call setup.

Figure 5:
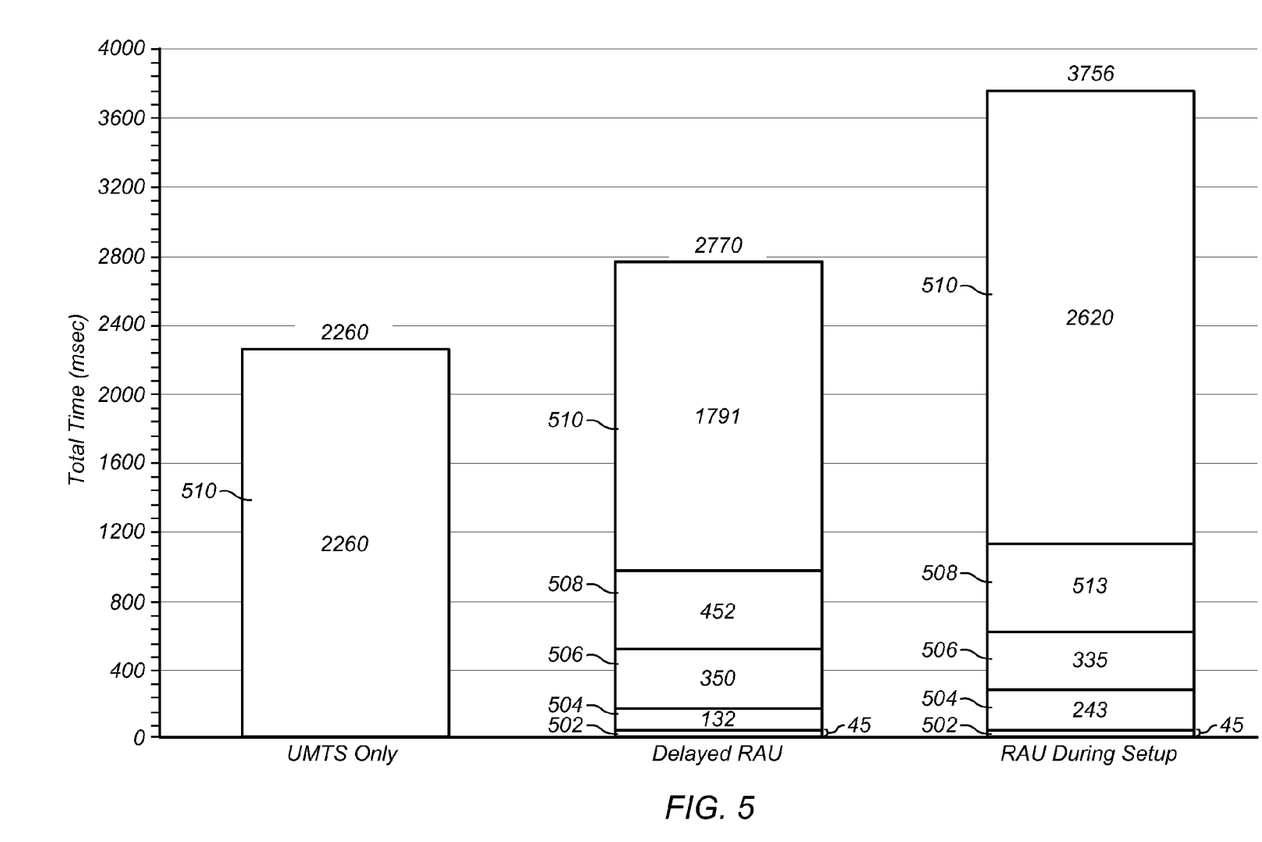
FIG. 5 is a graph illustrating differences in call setup time according to various embodiments.

FIG. 5—Exemplary Call Setup Times

FIG. 5 is a graph illustrating comparative call setup times of an implementation of the method of FIG. 4 and two other scenarios according to one set of embodiments. Those of skill in the art will readily recognize that these results and the following description provided with respect thereto are provided by way of example only, and are not intended to be limiting to the disclosure as a whole.

Illustrated in the graph of FIG. 5 are three call setup times, broken down into call setup components.

The leftmost call setup time shown is representative of a circuit-switched call setup time in a UMTS system, in which the UE 106 is already camped on the UMTS network. In this case, UMTS call setup procedures 510 (e.g., non-access stratum call setup procedures) are the only component of call setup.

The middle call setup time shown is representative of a circuit-switched call setup time, in which the UE 106 is initially camped on an LTE network, and is redirected to a UMTS network before performing UMTS call setup procedures. In this case, redirection procedures for releasing the LTE link and establishing a UMTS link (e.g., extended service request (ESR) procedure 502, RRC release procedure 504 (e.g., possibly including redirection information), tuning to/measuring UTRAN cells 506, reading master information blocks (MIBs)/system information blocks (SIBs) 508) may be performed in addition to UMTS non-access stratum call setup procedures 510. Note that in this scenario, PS registration procedures, particularly including a routing area update procedure, may be delayed until after the CS call is established, such as according to the method of FIG. 4.

For comparison, the rightmost call setup time shown is also representative of a circuit-switched call setup time, in which the UE 106 is initially camped on an LTE network, and is redirected to a UMTS network before performing UMTS call setup procedures. Similarly in this case, redirection procedures for releasing the LTE link and establishing a UMTS link may be performed in addition to UMTS non-access stratum call setup procedures 510. However, in this scenario, PS registration procedures, at least including a routing area update procedure, may be performed during CS call establishment/before the CS call is fully established, which may significantly increase the amount of time required for non-access stratum procedures 510.

Thus, as shown, call setup time for a CSFB call in which PS registration procedures are not delayed until after the CSFB call is established may be significantly more (e.g., is more in the exemplary scenarios illustrated) than for a CSFB call in which PS registration procedures are delayed until after the CSFB call is established. While a non-CSFB call may still experience lower call setup times than a CSFB call in which PS registration procedures are delayed until after the CSFB call is established, such a CSFB call may at least more closely approach the lower call setup time achieved in a non-CSFB call than a CSFB call in which PS registration procedures are not delayed.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a wireless user equipment (UE) device to initiate a circuit switched fallback (CSFB) call, the method comprising:
   receiving a request to establish a CSFB call;
   releasing a connection to a first cell, wherein the first cell provides packet-switched services, wherein the first cell does not provide circuit-switched services;
   establishing a connection to a second cell, wherein the second cell provides packet-switched services and circuit-switched services;
   establishing the CSFB call via the connection to the second cell;
   performing packet-switched registration with the second cell after the CSFB call is established.

2. The method of claim 1,
   wherein the packet-switched registration performed after the CSFB call is established comprises a routing area update.

3. The method of claim 2,
   wherein the first cell has a first routing area, wherein the second cell has a second routing area, wherein the second routing area is different than the first routing area, wherein the routing area update indicates to the network that the UE is in the second routing area.

4. The method of claim 2,
   wherein the first cell has a first routing area, wherein the second cell also has the first routing area, wherein the routing area update indicates to the network that the UE is in the first routing area.

5. The method of claim 1,
   wherein the first cell operates according to LTE, wherein the second cell operates according to UMTS.

6. The method of claim 1, wherein the CSFB call comprises either a UE originated call or a UE terminated call.

7. The method of claim 1, wherein establishing the CSFB call comprises completing circuit-switched radio bearer setup.

8. The method of claim 1, the method further comprising:
   receiving instructions for establishing the CSFB call, wherein the instructions are received via the connection to the first cell, wherein the instructions indicate to the UE to release the connection to the first cell, establish the connection to the second cell, and establish the CSFB call via the connection to the second cell.

9. A wireless user equipment (UE) device configured to establish a circuit-switched fallback (CSFB) call, the UE comprising:
   a radio, comprising one or more antennas for performing wireless communications;
   a processor;
   a memory medium comprising program instructions executable by the processor, wherein the program instructions are executable to:
      establish a first wireless link with a first cell, wherein the first cell provides a connection to a network, wherein the first cell provides packet-switched services, wherein the first cell does not provide circuit-switched services;

receive a request to establish a CSFB call;
receive, via the first wireless link, instructions to establish a second wireless link with a second cell;
release the first wireless link;
establish the second wireless link with a second cell, wherein the second cell provides a connection to the network, wherein the second cell provides packet-switched services and circuit-switched services;
establish the CSFB call via the second wireless link with the second cell;
perform packet-switched registration with the second cell after the CSFB call is established.

10. The UE of claim 9, wherein to receive the request to establish the CSFB call, the program instructions are executable to receive user input to the UE, wherein the user input initiates the CSFB call.

11. The UE of claim 9, wherein to receive the request to establish the CSFB call, the program instructions are executable to receive an indication from the network that another device is attempting to establish a circuit-switched call with the UE.

12. The UE of claim 9,
wherein each of the first and second cells has a respective routing area code, wherein the packet-switched registration comprises informing the network that the UE is in the routing area of the second cell.

13. The UE of claim 9,
wherein the first cell operates according to a first wireless communication technology, wherein the second cell operates according to a second wireless communication technology, wherein the first and second wireless communication technologies are different wireless communication technologies.

14. The UE of claim 13, wherein the instructions to establish the second wireless link with the second cell indicate to the UE to search for cells that operate according to the second wireless communication technology, wherein the program instructions are further executable to:
search for cells that operate according to the second wireless communication technology;
discover the second cell based on searching for cells that operate according to the second wireless communication technology;
establish the second wireless link with the second cell based on discovering the second cell.

15. A non-transitory computer accessible memory medium comprising program instructions for a wireless user equipment (UE) device to establish a circuit-switched fallback (CSFB) call, wherein the program instructions are executable to:
receive a request to establish a circuit-switched (CS) call;
release a first wireless link with a first cell, wherein the first cell has a routing area code, wherein the first cell provides a connection to a first network, wherein the first network provides packet-switched services, wherein the first network does not provide circuit-switched services;
establish a second wireless link with a second cell, wherein the second cell has a routing area code, wherein the second cell provides a connection to a second network, wherein the second network provides circuit-switched services and packet-switched services;
establish the CS call via the second wireless link to the second cell;
register with the second network with the routing area code of the second cell after the CSFB call is established.

16. The memory medium of claim 15,
wherein the first wireless link operates according to a first wireless communication technology, wherein the second wireless link operates according to a second wireless communication technology.

17. The memory medium of claim 16,
wherein the first network operates according to the first wireless communication technology, wherein the second network operates according to the second wireless communication technology;
wherein the first network and the second network are communicatively coupled.

18. The memory medium of claim 17, wherein the program instructions are further executable to:
receive instructions for establishing the CS call as a CSFB call, wherein the instructions are received from the first network via the first wireless link with the first cell, wherein the instructions indicate to release the first wireless link and establish the second wireless link.

19. The memory medium of claim 15,
wherein the UE remains registered with the first network with the routing area code of the first cell until registering with the second network with the routing area code of the second cell after the CSFB call is established.

20. The memory medium of claim 19,
wherein registering with the second network with the routing area code of the second cell after the CSFB call is established configures the UE to receive packet-switched services from the second network via the second wireless link with the second cell.

21. A method for a wireless user equipment (UE) device to establish a circuit-switched fallback (CSFB) call, the method comprising:
establishing a first wireless link with a first cell, wherein the first cell provides a connection to a network, wherein the first cell provides packet-switched services, wherein the first cell does not provide circuit-switched services, wherein the first cell has a routing area code;
receiving a request to establish a call;
receiving, via the first wireless link, instructions to establish the call as a CSFB call, wherein the instructions indicate to the UE to release the first wireless link with the first cell and establish a second wireless link with a second cell;
releasing the first wireless link with the first cell in response to the instructions;
establishing the second wireless link with the second cell in response to the instructions, wherein the second cell provides a connection to the network, wherein the second cell provides circuit-switched services and packet-switched services, wherein the second cell has a routing area code;
establishing the CSFB call via the second wireless link to the second cell, wherein the CSFB call comprises a circuit-switched service;
registering with the network with the routing area code of the second cell after the CSFB call is established.

22. The method of claim 21,
wherein registering with the network with the routing area code of the second cell configures the UE for packet-switched services with the network via the second wireless link with the second cell.

23. The method of claim 21,
wherein establishing the CSFB call via the wireless link with the second cell comprises establishing radio bearers for the CSFB call and alerting the UE that the call is established.

24. The method of claim 21,
wherein the UE remains registered with the network with the routing area code of the first cell until said registering with the network with the routing area code of the second cell.

25. A non-transitory computer-accessible memory medium comprising program instructions for establishing a circuit-switched fallback (CSFB) call, wherein the program instructions are executable to:
establish a first wireless link with a first cell, wherein the first cell provides a connection to a network, wherein the first cell provides packet-switched services, wherein the first cell does not provide circuit-switched services, wherein the first cell has a routing area code;
receive a request to establish a CSFB call;
release the first wireless link;
establish a second wireless link with a second cell, wherein the second cell provides a connection to the network, wherein the second cell provides packet-switched services and circuit-switched services, wherein the second cell has a routing area code;
establish the CSFB call via the second wireless link with the second cell, wherein establishing the CSFB call via the wireless link with the second cell comprises establishing radio bearers for the CSFB call;
register with the network with the routing area code of the second cell after the CSFB call is established.

* * * * *